United States Patent [19]
Vincent

[11] Patent Number: 5,671,059
[45] Date of Patent: Sep. 23, 1997

[54] ELECTROLUMINESCENT COLOR DEVICE

[75] Inventor: Kent D. Vincent, Cupertino, Calif.

[73] Assignee: Hewlett-Packard Company, Palo Alto, Calif.

[21] Appl. No.: 531,435

[22] Filed: Sep. 21, 1995

[51] Int. Cl.⁶ .................................................. G01J 3/46
[52] U.S. Cl. .................................................. 356/402
[58] Field of Search ........................... 356/402–411, 224; 250/226

[56] References Cited

U.S. PATENT DOCUMENTS

| | | |
|---|---|---|
| 3,634,694 | 1/1972 | Hardesty .............................. 356/224 |
| 4,301,451 | 11/1981 | Barta . |
| 5,137,364 | 8/1992 | McCarthy . |
| 5,144,498 | 9/1992 | Vincent . |
| 5,272,518 | 12/1993 | Vincent . |
| 5,528,339 | 6/1996 | Buhr et al. . |

*Primary Examiner*—K. Hantis
*Attorney, Agent, or Firm*—John L. Imperato

[57] ABSTRACT

Multiple electroluminescent (EL) emitters are constructed from layers deposited on a substrate and incorporated with a broadband sensor to form a colorimeter. The EL emitters produce light covering spectral segments determined by a filter layer and an active layer wherein the spectral segments sufficiently cover the visible spectrum to enable a wide range of colors to be accurately measured. The colorimeter is mounted in a desktop color printer to measure the color content of printed images and to calibrate the printer.

10 Claims, 3 Drawing Sheets

ELECTROLUMINESCENT COLOR DEVICE

FIELD OF THE INVENTION

This invention relates to a color calibration device.

BACKGROUND OF THE INVENTION

Desktop color printers are often used to replicate color images from digital image data in applications such as computer animation, video production and digital photography. While the sources producing the digital image data may have excellent color representation, the printed images produced by the printer are limited by color errors due to unpredictable variations in print media, ink composition and printing mechanisms. A color measurement system may be used to calibrate the printer and greatly enhance its color accuracy. By comparing the measured color of the printed image to the digital image data used to generate the image, correction factors are derived to correct the color errors. Unfortunately, presently available color measurement systems are either too expensive to be incorporated into a desktop color printer or their measurement accuracy is insufficient to significantly reduce color errors.

A prior an color measurement system taught by McCarthy in U.S. Pat. No. 5,137,364, which issued Aug. 11, 1992, may be inexpensive to manufacture but has limited measurement accuracy. To measure color, this system uses light emitting diodes (LEDs) as a wavelength discriminating light source in conjunction with a broadband light sensor. Unfortunately, LED's inherently produce light in discrete and non-overlapping spectrally narrow bands, limiting the range of colors that this type of system can measure. LED's are also temperature dependent and require complex temperature sensing and regulation components to achieve measurement consistency.

Prior art color measurement systems such as spectrophotometers are highly accurate but they are expensive to manufacture. Spectrophotometers use a broadband light emitter and a light sensor, but they also rely on complex wavelength discriminating optical components, such as variable wavelength filters to accurately measure color. Although spectrophotometers are valuable in the development of printing mechanisms and inks, they are too expensive to be integrated into a desktop color printer.

SUMMARY OF THE INVENTION

In accordance with an illustrated preferred embodiment of the present invention, electroluminescent (EL) emitters are incorporated into a colorimeter that is inexpensive to manufacture and greatly enhances the color accuracy of color printers. Multiple electroluminescent (EL) emitters are integrated on a substrate and each EL emitter produces light spanning a spectral segment such that the visible light spectrum is sufficiently covered by the EL emitters to enable a wide range of colors to be accurately measured. Since the spectral segments of the produced light are tailored by processing steps and materials used to fabricate the EL emitters, the colorimeter has a low manufacturing cost. The EL emitters illuminate a color sample while a broadband sensor receives the light reflected by the color sample. Analysis of the received light is then used to determine the color content of the color sample. The colorimeter may be mounted in a desktop color printer to measure the color content of printed test images. From the measured color content, the printer is calibrated to enhance the color accuracy of printed images subsequently produced by the printer.

The number of EL emitters and their spectral characteristics adapt the colorimeter to other color measurement applications, such as color matching of wall paints and fabrics.

DETAILED DESCRIPTION OF THE PREFERRED EMBODIMENT

Figure 1:
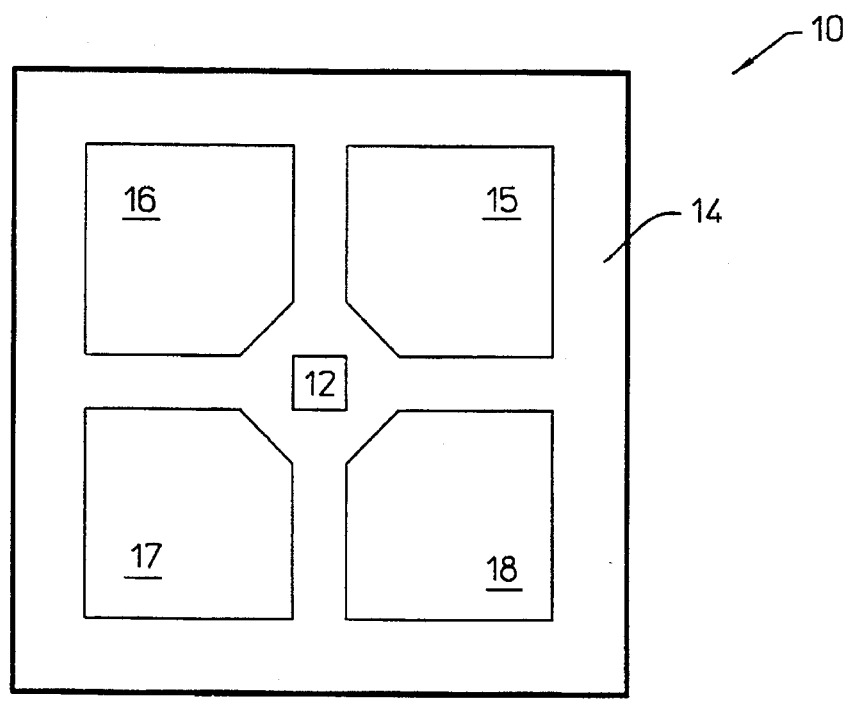
FIG. 1 shows a top view of a colorimeter including integrated electroluminescent (EL) emitters that is constructed in accordance with the preferred embodiment of the present invention.

FIG. 1 shows a top view of a colorimeter 10 including integrated electroluminescent (EL) emitters that is constructed in accordance with the preferred embodiment of the present invention. A sensor 12 that is responsive to visible light is positioned in the center of the colorimeter 10. The sensor 12 is an amorphous or polysilicon structure vapor deposited directly onto a substrate 14. Alternatively, the sensor 12 is a discrete chip that is adhered to the substrate 14 and connected electrically to an electrode (not shown) with a wire bond (not shown). Four electroluminescent (EL) emitters 15, 16, 17, 18 are shown disposed about the sensor 12. Each EL emitter 15-18 produces light spanning a different spectral segment of the visible spectrum. Although the spectral segments may partially overlap, the visible spectrum is sufficiently covered by the aggregate of the EL emitters 15-18. The number of EL emitters is chosen to enhance the symmetry and uniformity of the light produced, improving the color measurement accuracy. In this example, the substrate 14 is flat and square, however, the substrate 14 is easily constructed to have a different shape and to conform to a specific color measurement application.

Figure 2:
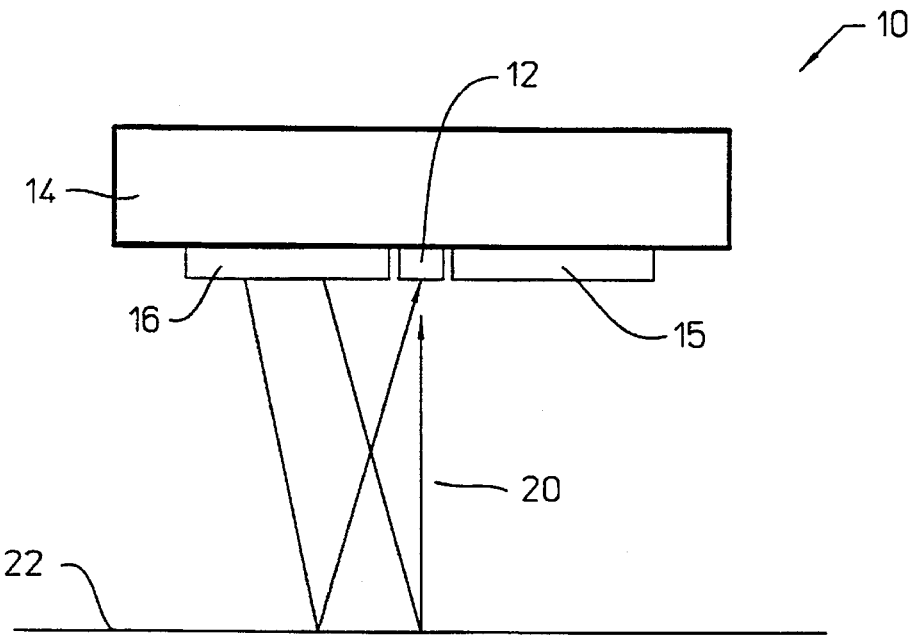
FIG. 2 shows an end view of the colorimeter shown in FIG. 1.

FIG. 2 shows a side view of the colorimeter 10 operated in accordance with the preferred embodiment of the present invention. The colorimeter 10 is placed in proximity to a color sample 22, such as paper or other print media, upon which a color image to be measured has been printed. An EL emitter 16 is electrically stimulated to generate light covering a predetermined spectral segment of the visible spectrum. Optical paths 20 of light are shown schematically. The light is incident upon the color sample 22 where a portion of the light is reflected and then received by the sensor 12. The received light is converted into a received electrical signal that corresponds to the spectral reflection characteristics for the given spectral segment of the light emitted from the EL emitter. The received electrical signal is then analyzed by a processing unit (not shown) to determine the color content of the color image. Each of the EL emitters 15, 16 is electrically stimulated in sequence so that a series of color measurements, one corresponding to each spectral segment, is performed by the colorimeter 10. Alternatively, two or more EL emitters are activated simultaneously, combining the spectral segments of the EL emitters.

Figure 3:
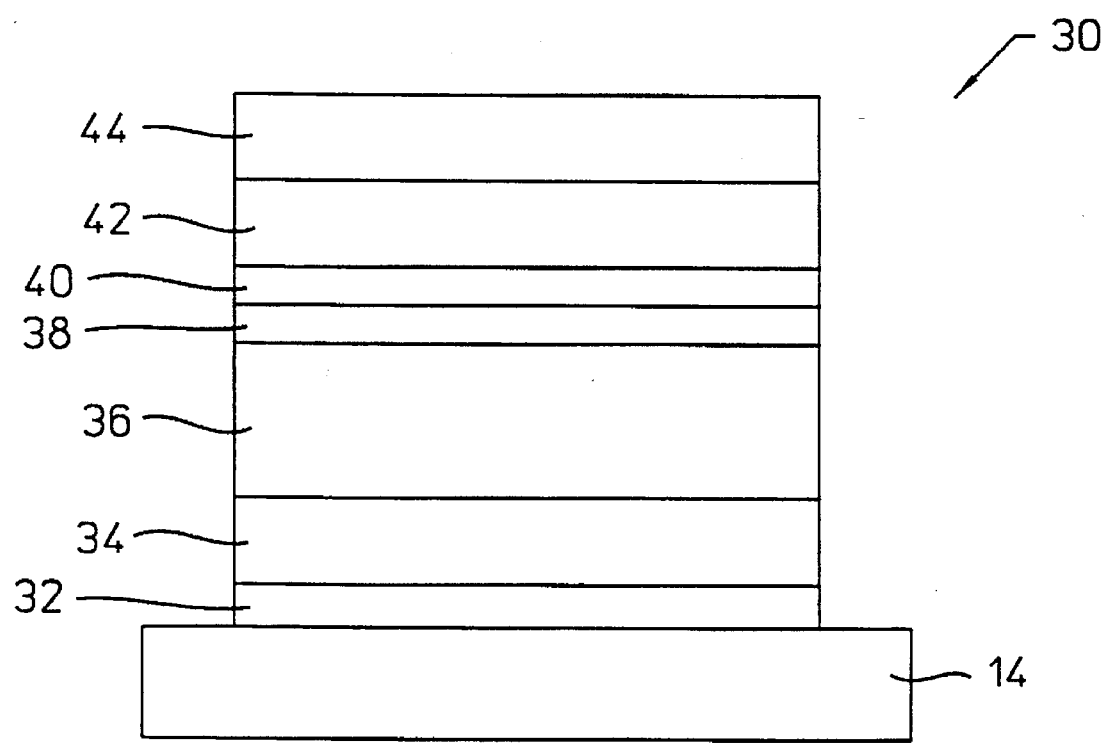
FIG. 3 shows a cross-sectional view of an EL emitter that is constructed in accordance with the preferred embodiment of the present invention.

FIG. 3 shows a cross-sectional view of an EL emitter 30 that is constructed in accordance with the preferred embodiment of the present invention. An EL emitter 30 is constructed on a substrate 14 such as glass, ceramic or a similar flat, smooth surface that is compatible with vapor deposition processes and materials used to form subsequent layers on the substrate 14. The substrate is coated with an electrically conductive first electrode layer 32 patterned to have address lines (not shown) which provide electrical connectivity to the colorimeter. The first electrode layer 32 is formed by thin film deposition of Aluminum, Indium Tin Oxide or other metals onto the substrate 14. Alternatively, the first electrode layer 32 is formed by screen deposition of alloy pastes such as Silver Platinum onto the substrate 14.

A first dielectric layer 34 formed adjacent to the electrode layer 32 provides current limiting and injects electrons into an active layer 36. Dielectric materials for the first dielectric layer 34, such as vapor deposited silicon oxynitride or thick film deposited $PbNbO_3$, $BaTiO_3$ or other materials that have a high dielectric constant and a high dielectric strength to assure high efficiency of the EL emitter 30. The active layer 36 is vapor deposited on top of the first dielectric layer 34 to a thickness of approximately 10,000 Angstroms. The active layer 36, which may consist of ZnS, CaS and Strontium Sulfide, doped with Mn, $Ce^{3+}$ or other suitable dopant materials, is consistent with the material combinations of flat panel electroluminescent displays used in computers. The active layer 36 is optionally over-coated with a second dielectric layer 38 of vapor deposited material, such as Silicon Oxynitride. Alternatively, the second dielectric layer 38 is omitted, provided that the first dielectric layer 34 is sufficiently thick to provide current limiting to the active layer 36.

A second electrode layer 40 is then deposited above the active layer 36 or above the second dielectric layer 38 (if present). Indium Tin Oxide is a good material choice for the second electrode layer 40 because of its electrical conductivity and optical transparency. Electrical connections (not shown) formed in the second electrode layer 40 drive the active layer 36. The active layer 36 produces a light signal in response to an electrical signal, such as an alternating voltage applied to electrodes (not shown) connected to the first electrode layer 32 and to the second electrode layer 40.

A filter layer 42, such as dye dissolved in polyimide is vapor deposited over the second electrode layer 40. Alternatively, the filter layer 42 is fluorescent. Whether the filter layer 42 is light absorbing or fluorescent, it is chosen to correspond with the active layer 36 so that the light produced by the EL emitter 30 is tailored to cover the desired spectral segment. An optional protective layer 44, such as vapor deposited glass is deposited over the filter layer 42. Other means to tailor the light signal produced by the active layer 36 into spectral segments are also apparent. In one example, separate transparent colored plates or a continuous transparent plate having selectively deposited filter colorants are placed above the active layer 36 and spatially aligned to correspond to each EL emitter. In another example, the substrate 14 is fabricated from a transparent material adapted to accommodate filter colorants, that tailor the light signal into spectral segments.

The spectral segments of the light produced by the EL emitters 30 are also tailored by the active layer 36 and the filter layer 42. Each EL emitter 30 of the colorimeter 10 may be fabricated to have a white light emitting active layer 36 that is formed using a combination of dopants such as those previously mentioned. The filter layer 42 then filters the white light and determines the spectral segment of light produced by each EL emitter 30. A specific dye for each EL emitter 30 is selectively deposited within the filter layer 42 by masking the physical area corresponding to each emitter. Alternatively, the spectral segment of light produced by the EL emitter 30 is tailored by varying materials, such as the dopants, used in the fabrication of the active layer 36, or by varying the frequency or magnitude of the electrical signal in a region of the active layer 36 corresponding to each EL emitter 30. Since multiple EL emitters are integrated onto a substrate 14, die scribing, mechanical mounting and wire bonding processes associated with color measurement systems that use light emitting diodes (LEDs) are eliminated.

Figure 4:
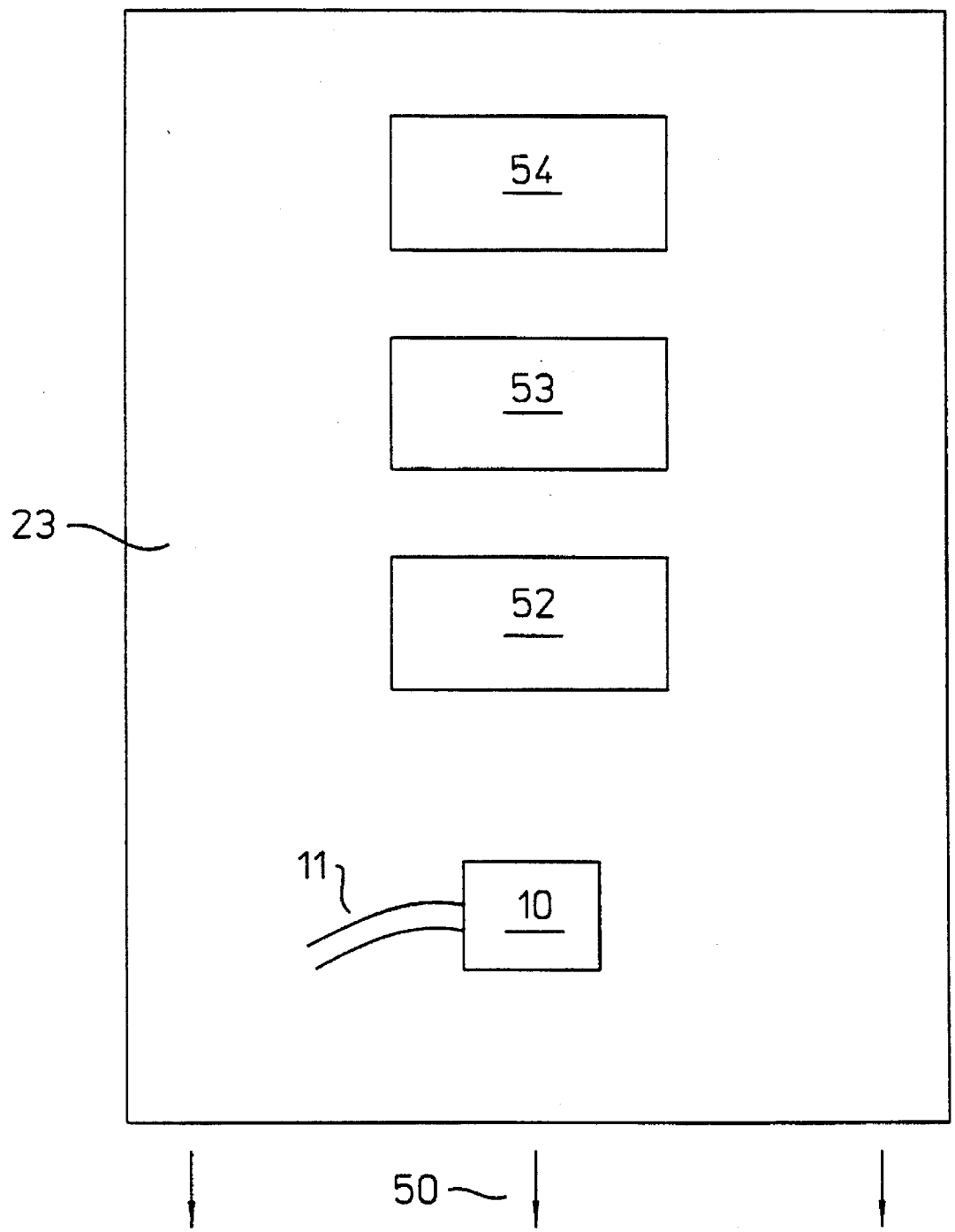
FIG. 4 shows the colorimeter mounted for calibrating a color printer.

FIG. 4 shows the colorimeter 10 mounted to calibrate a desktop color printer. The colorimeter 10 is electrically connected to the color printer by electrodes 11 and is preferably mounted along the exiting paper path in a position where the paper 23 is viewed by the colorimeter 10 after an image has been printed. The colorimeter 10 is mounted in the printer with its EL emitters and sensor facing toward the paper 23. The paper then moves below the colorimeter 10 in the direction indicated schematically by the direction arrows 50. Three color patches 52, 53, 54 are shown, each positioned on the paper 23 so that after each color patch is printed, the color patch reflects the light emitted from the EL emitters and the reflected light is received by the sensor. The colorimeter 10 first makes a baseline measurement on a portion of the paper 23 not containing a color patch to account for ambient lighting conditions and paper color. Then, as each color patch 52–54 enters the optical path of the light from EL emitters of the colorimeter 10, each EL emitter is activated one or more times, enabling the sensor to obtain a representative reading of the light reflected from the color patch 52–54.

The color content of each color patch 52–54 produced by the printer is affected by a variety of factors, such as dynamic changes in toner properties, ink compositions or characteristics of the print media, such as paper gloss and color. Degradation of print mechanisms due to aging also causes unpredictable variations or color errors in the color content of the color patches 52–54. The sensor readings obtained from the color patches 52–54 are readily analyzed in a processing unit, such as a microprocessor, to compute a measured color value. The difference between the measured color value and a pre-established color value present in the digital image data forms correction factors. The correction factors modify the digital image data, causing a printhead driver, toning or inking means of the color printer to correct for color errors caused by dynamic changes in these printing mechanism or for the characteristics of the print media.

Although the colorimeter 10 as shown includes either an integrated sensor or a discrete sensor mounted on the substrate, an alternative embodiment includes the sensor positioned at other suitable points at which a representative reflection of light can be received. Other mounting positions for the colorimeter 10 are also apparent. For example, in inkjet or dot matrix printers, the colorimeter 10 may be fixed to a traversing carriage that dispenses the ink. For portable color measurement of wall paints and fabrics for color matching applications, the colorimeter 10 is incorporated into a hand-held color probe. A lens, optical reflector or other optical components positioned between the colorimeter 10 and a color sample may be employed to optimize the optical performance in a desired application. The EL emitters may also be housed in an integrating sphere to enhance light output uniformity, while the sensor is located external to the integrating sphere along the light reflection path of a color sample being measured.

I claim:

1. A colorimeter for measuring color content of a color sample, comprising:

a series of electroluminescent emitters, illuminating the color sample, each emitter responsive to an applied electrical signal and emitting light spanning a spectral segment wherein the visible light spectrum is substantially covered by the combination of spectral segments, the series including;

a substrate, a first electrode layer on the substrate, a second electrode layer, an active layer between the first electrode layer and the second electrode layer, producing a light signal in response to the electrical signal applied across the first electrode layer and the second electrode layer, a first dielectric layer adjacent to the active layer, means for tailoring the light signal into spectral segments; and a broadband sensor, receiving light reflected by the color sample and producing a corresponding output signal.

2. The colorimeter of claim 1, further comprising a second dielectric layer adjacent to the active layer, opposite to the first dielectric layer.

3. The colorimeter of claim 1 wherein the means for tailoring the light signal into spectral segments comprises a filter layer containing light absorbing dye.

4. The colorimeter of claim 1 wherein the means for tailoring the light signal into spectral segments comprises a fluorescent filter layer.

5. The colorimeter of claim 1 wherein the means for tailoring the light signal into spectral segments comprises dopants within the active layer.

6. The colorimeter of claim 3, further comprising a protective layer covering the filter layer containing light absorbing dye.

7. The colorimeter of claim 1 wherein the means for tailoring the light signal into spectral segments comprises multiple light absorbing dye regions, each dye region corresponding to an electroluminescent emitter.

8. The colorimeter of claim 4, further comprising a protective layer covering the fluorescent filter layer.

9. The colorimeter of claim 1 wherein at least one of the first electrode layer and the second electrode layer is transparent.

10. The colorimeter of claim 1 wherein the means for tailoring the light signal into spectral segments comprises the substrate.

\* \* \* \* \*